United States Patent
Drexel et al.

(10) Patent No.: US 6,269,692 B1
(45) Date of Patent: Aug. 7, 2001

(54) MASS FLOW MEASURING ASSEMBLY HAVING LOW PRESSURE DROP AND FAST RESPONSE TIME

(75) Inventors: Charles F. Drexel, Rancho Palos Verdes; Hamid Saghatchi, Orange, both of CA (US)

(73) Assignee: DXL USA Inc., Torrance, CA (US)

( * ) Notice: Subject to any disclaimer, the term of this patent is extended or adjusted under 35 U.S.C. 154(b) by 0 days.

(21) Appl. No.: 09/241,883

(22) Filed: Feb. 1, 1999

(51) Int. Cl.[7] ................................ G01F 1/68; G01F 1/44; F16K 31/42
(52) U.S. Cl. ....................... 73/204.27; 73/204.21; 73/861.63; 137/486
(58) Field of Search ................... 73/204.27, 204.25, 73/204.22, 204.21, 204.11, 861.52, 861.63, 861.64; 137/486, 341, 487.5

(56) References Cited

U.S. PATENT DOCUMENTS

| | | |
|---|---|---|
| 1,043,983 | 11/1912 | Thomas . |
| 1,193,488 | 8/1916 | Thomas . |
| 1,222,492 | 4/1917 | Thomas . |
| 2,729,976 | 1/1956 | Laub . |
| 3,438,254 * | 4/1969 | Seeley ................ 73/204.25 |
| 3,650,151 | 3/1972 | Drexel . |
| 3,733,901 * | 5/1973 | Halmi ................ 73/861.64 |
| 3,938,384 * | 2/1976 | Blair ................ 73/204.27 |
| 4,484,472 * | 11/1984 | Licinit et al. ................ 73/204.11 |
| 4,487,062 | 12/1984 | Olin et al. . |
| 4,487,213 * | 12/1984 | Gates et al. ................ 73/204.25 |
| 4,489,593 * | 12/1984 | Pieters et al. ................ 73/38 |
| 4,695,034 * | 9/1987 | Shimizu et al. ................ 137/486 |
| 4,921,005 * | 5/1990 | Ohmi et al. ................ 73/204.25 |
| 4,949,578 * | 8/1990 | Harpster ................ 73/202.5 |
| 4,972,708 * | 11/1990 | Wiegleb et al. ................ 73/204.22 |
| 4,984,460 | 1/1991 | Isoda . |
| 5,100,100 * | 3/1992 | Benson et al. ................ 137/486 |
| 5,127,173 * | 7/1992 | Thurston et al. ................ 73/202 |
| 5,285,673 * | 2/1994 | Drexel et al. ................ 73/204.27 |
| 5,347,861 * | 9/1994 | Drexel et al. ................ 73/204.22 |
| 5,461,913 * | 10/1995 | Hinkle et al. ................ 73/204.25 |
| 5,821,155 * | 10/1998 | Izumi et al. ................ 438/479 |
| 5,865,205 * | 2/1999 | Wilmer ................ 137/486 |
| 5,944,048 * | 8/1999 | Bump et al. ................ 137/486 |

OTHER PUBLICATIONS

H. Blasius, "Laminare Stromung in Kanalen wechseldner Breite," Zeitschrift f. Mathematik U. Physik, vol. 59, pp. 225–223 (1910).

A.H. Gibson, "The Conversion of Kinetic to Pressure Energy in the Flow of Water Through Passages Having Divergent Boundaries," Engineering, vol. 93, pp. 205–206 (1912).

* cited by examiner

Primary Examiner—Benjamin R. Fuller
Assistant Examiner—Jagdish Patel
(74) Attorney, Agent, or Firm—Edward Gray

(57) ABSTRACT

An assembly for measuring the mass flow and flow rate of gases such as are used in semiconductor fabrication processes. The assembly includes an axial flow passage, viz., a capillary tube with a bore of about 0.050 inch diameter and a wall thickness of about 0.002 inch, having a downstream end connected to a diffuser section having an axially symmetric, diverging passage. Gas exiting the diffuser section has a low pressure drop because the gas has expanded at a low, controlled rate, converting velocity head into pressure head, and because the tube and diffuser section passage are in-line, eliminating right-angle turns. The assembly also includes two resistance thermometers, coils of iron-nickel alloy wire about 0.0004 inch in diameter, providing a differential temperature measurement with a time constant of less than 4 seconds. When incorporated into a mass flow controller admitting arsine gas from a storage container into a vacuum chamber, the assembly can maintain a flow rate of 5 sccm when the residual gas pressure in the container is as low as 5 Torr. The assembly can also be incorporated into a mass flowmeter.

19 Claims, 8 Drawing Sheets

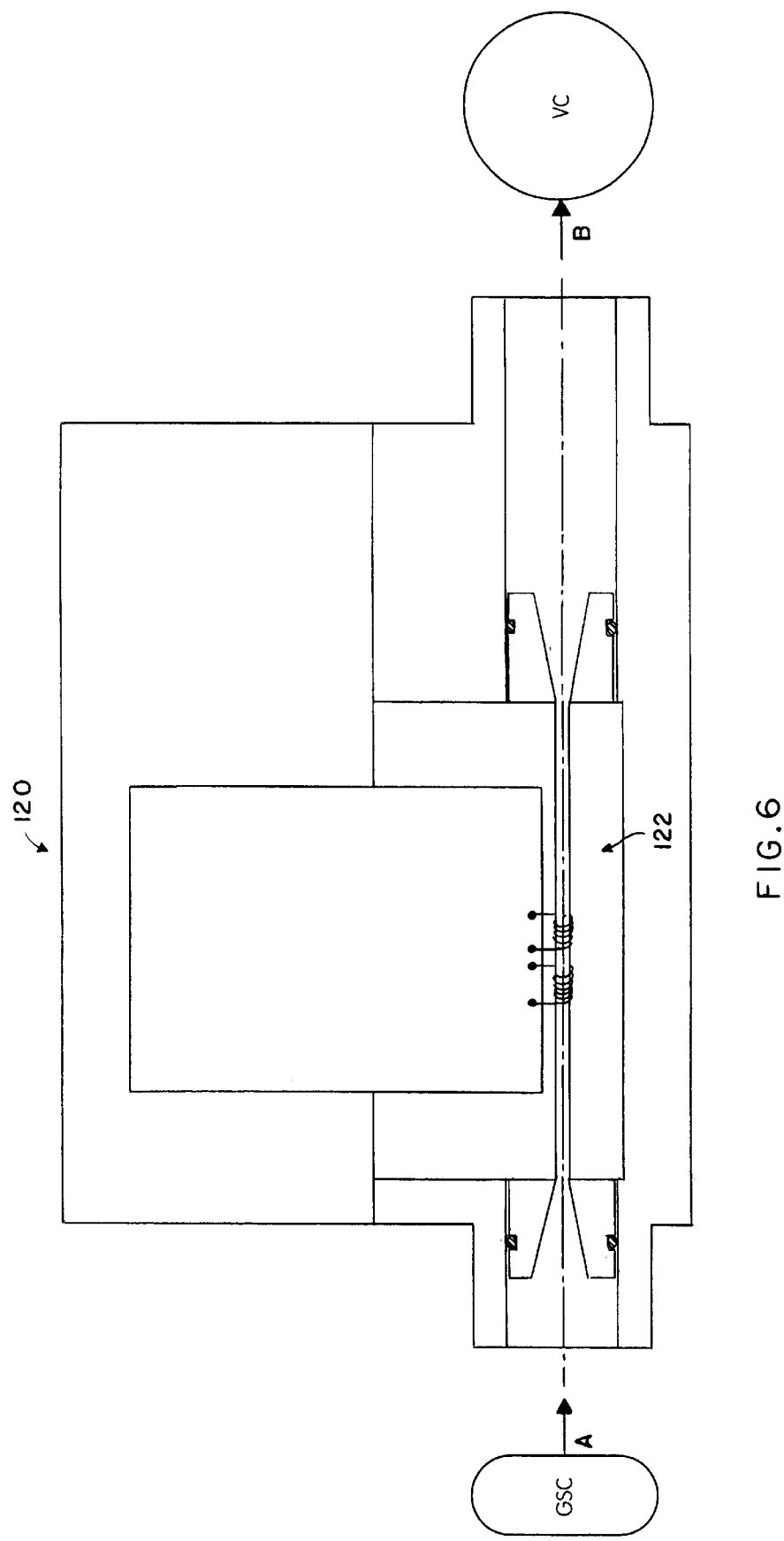

MASS FLOW MEASURING ASSEMBLY HAVING LOW PRESSURE DROP AND FAST RESPONSE TIME

BACKGROUND OF THE INVENTION

1. Field of the Invention

The present invention relates to instrumentation for measuring and controlling the flow of fluids, and more particularly to an assembly for measuring the mass flow of gases which can be incorporated into a flow controller or flowmeter.

2. Description of the Related Art

The measurement and control of the mass flow of gases is important in many industries. During the manufacture of semiconductor chips, for example, many of the processes require precise reaction of two or more gases under carefully controlled conditions. Since chemical reactions occur at the molecular level, control of mass flow is the most direct way to regulate the absolute and relative quantities of gaseous reactants.

There have been developed in the art a variety of instruments for measuring the mass flow rate of gases from less than one standard cubic centimeter(s) per minute (sccm) to more than 500,000 sccm. The prevalent design of such instruments requires that the flowing gas be divided into at least two portions. In a typical instrument, a relatively small portion of the total flow is routed through a sensor assembly where the mass flow is measured, while the remainder, i.e., almost all of the flow, is routed through a flow splitter assembly disposed generally parallel to the sensor assembly. The sensor assembly includes a capillary tube around which are wound two resistance thermometers as identical as possible in electrical and mechanical characteristics. Each thermometer is wound in a tight coil in thermal communication with the outer surface of the tube. The thermometers form two legs of an electronic bridge; the other two legs are usually fixed resistors. When a voltage is applied across the bridge, current flows through each thermometer, causing it to self-heat. When there is no flow of gas through the capillary tube, the thermometers heat up identically. As gas begins to flow through the tube, the gas first cools the upstream thermometer and then the downstream thermometer which is cooled less because the gas is now slightly warmer due to heating by the upstream thermometer. The resultant temperature differential is a function of both the mass flow rate and the properties of the particular gas. As disclosed in U.S. Pat. No. 1,193,488, C. C. Thomas more than eighty years ago utilized separate sensor and flow splitter assemblies and resistance thermometers in designing gas flowmeters. In U.S. Pat. No. 1,222,492, he disclosed a flowmeter which measured the rate of gas mass flow by imparting heat to raise the gas temperature while automatically regulating the imparting of heat so as to keep constant either the rate at which heat is imparted or the temperature rise produced.

Typically, a signal conditioning circuit is used to compensate for nonlinearities in sensor response, account for changes in operating parameters such as resistance values, and convert analog output signals into digital format. Variations of the basic sensor assembly design include: interposing a heater coil between the two thermometer coils and reducing the bridge current so that the thermometers do not self-heat; substituting thermocouples or thermistors for the resistance thermometers; or arranging the signal conditioning circuit so that it maintains each thermometer at the same temperature, using the difference in wattage to the coils to determine the mass flow rate.

In some semiconductor processes such as ion implantation, the process gases must be stored and handled with great care and not be wasted, because they are toxic, highly reactive and expensive. Examples are arsine, phosphine and boron trifluoride. An ion implanter chamber operates at a very low pressure approaching a hard vacuum, drawing small portions of gas at low flow rates, typically 0.25 to 10 sccm, out of a storage container through a mass flow controller. Should an accident occur breaking the vacuum, gas stored conventionally in a pressurized container would be released into the environment, with expensive if not hazardous consequences. As disclosed in U.S. Pat. Nos. 5,518,528, 5,704,965 and 5,707,424, a gas storage system has been developed by Advanced Technology Materials, Inc. (ATMI) of Danbury, Conn. wherein gases are stored at slightly less than atmospheric pressure in special containers filled with porous resin beads which adsorb gas molecules on their collectively large total surface area. In the event of a vacuum break there will be minimal escape of gas. The amount of gas in a container varies non-linearly with pressure; the bottle is 100% full at atmospheric pressure (760 Torr), but may still be half full at 75 Torr. Since the gas is expensive and since it is also expensive to shut down and change the container, it is desirable to be able to operate the system at the lowest possible container pressure to avoid wasting gas and having frequent shutdowns. In order to withdraw essentially all of the stored gas, it is important that the mass flow controller have a very low pressure drop at the rated flow of the implanter. With existing controllers, the combined pressure drop through the sensor and flow splitter assemblies at a nominal flow rate of 5 sccm and an exit pressure of zero Torr (common operating parameters) results in a residual gas pressure in the container of 50 to 80 Torr. Because of the mechanism whereby the gas desorbs from the porous beads, at such pressures only about 60 percent of the gas can be extracted, resulting in a substantial economic penalty. Pressure drop in the flow controller is due to the small diameter of the sensor tubing, resistance of the flow splitter, multiple right angle turns traversed by gas entering and exiting the sensor assembly, and losses at the entrance and exit of the sensor assembly. Thus, there is a need for a mass flow controller which has sufficiently low pressure drop that most of the gas can be extracted. At a flow rate of 5 sccm, this requires that the mass flow controller be operative at container pressures of 10 Torr and below.

Semiconductor fabrication equipment such as ion implanters require that a ass flow controller have a response time of less than 4 to 5 seconds to avoid safety interrupts. To meet this requirement, the capillary tube should be as small as possible to minimize thermal mass. This is the principal reason why the prevalent design of such instrumentations divides the flow into two paths. Capillary tubes presently in use, which have a bore about 0.010 inch in diameter and a wall thickness of about 0.002 inch, have a response time of about 1 second. However, a bore this narrow is unsuitable for an in-line mass flow controller where all the gas goes through the sensor assembly. Thus, there is a need for a mass flow controller with a flow measuring assembly which allows in-line flow rates in the 0.25 to 10 sccm regime, yet has a suitably short time constant.

U.S. Pat. No. 4,984,460 ("'460") to Y. Isoda, entitled "Mass Flowmeter" is directed to a mass flowmeter adapted for low fluid flow rates, typically about 5 sccm. The flowmeter has a single conduit, rather than separate flow splitter and sensor assemblies, within which are mounted an upstream and a downstream resistance thermometer coil, each included in a separate constant temperature difference circuit. Each circuit also includes an ambient temperature detecting resistor having approximately the same resistance as the coil and a temperature difference setting resistor, connected in series to the coil. The circuits are connected to a control unit which controls the differences between the temperatures of the coils and the ambient temperature to be approximately the same as a value set by the temperature difference setting resistor. Mass flow rate is measured by detecting a difference in the amounts of energy supplied to the coils.

U.S. Pat. No. 4,487,062 ("'062") J. G. Olin et al., entitled "Mass Flowmeter" is directed to a flowmeter for measuring the mass flow and flow rate of gasoline, oil, cooling liquids or other fluids. The flowmeter includes a straight sensor assembly disposed parallel to a flow splitter assembly, and is configured so that fluid entering and exiting the sensor assembly must traverse a sequence of four right-angle turns. The sensor assembly includes a capillary tube around which are wound two resistance thermometer coils which are segments of a single coil with an electrical lead connected at its center. An evacuated enclosure surrounding the coils prevents convection effects between them and conductive transfer of heat away from the capillary tube, and also acts to reduce coil response time.

U.S. Pat. No. 3,650,151 ("'151") to C. F. Drexel, entitled "Fluid Flow Measuring System," is directed to a control system which permits the absolute mass flow rate of a fluid to be monitored and controlled regardless of changes in state parameters such as pressures and temperatures. The system is adapted for use in chemical processes where a liquid is vaporized by passing a carrier gas through or over it so that the carrier gas transports the vaporized liquid into a reaction chamber. The system also is adaptable to mixing gases, and controlling the amount of a sublimating solid by varying the flow rate of carrier gas through a bed of the solid. The system includes a mass flow sensor assembly in parallel with a conduit tube. The sensor assembly includes a capillary tube around which are wound a heater element disposed between two resistance thermometer coils. The coils are connected with two fixed resistors in a bridge circuit which is part of a signal conditioner that provides a linear output voltage as a function of mass flow.

U.S. Pat. No. 2,729,976 ("'976") to J. H. Laub, entitled "Thermal Flowmeter" discloses a flowmeter having a conduit through which flows a liquid or gas. The conduit includes a metallic pipe section thermally insulated from the adjacent upstream and downstream conduit sections. Heat is transferred to the flowing medium by means of a heater coil wound around the pipe section which is upstream of a resistance thermometer coil. Second and third coils wound around the upstream conduit section serve as a reference resistance thermometer and a temperature compensator. Three additional embodiments each utilize a sensor assembly parallel to the conduit. In one embodiment the pressure drop across the sensor assembly is "relatively small." Fluid entering and exiting the sensor assembly must traverse a sequence of right-angle and arcuate turns.

None of these references discloses a sensor assembly which achieves both low pressure drop and fast response time. The '460 and '151 patents address neither roblem. The '062 patent purports to provide a fast response time, but no data are shown. In one embodiment the '976 patent provides a "relatively small" pressure drop, but again no data are shown.

Increasing the cross-section of a conduit in the direction of flow of a fluid, either suddenly or gradually, reduces the velocity of flow and converts a portion of the kinetic energy of flow into pressure energy. It has long been known that by increasing the cross-section gradually, shock and consequent eddy formation and loss of energy would be reduced. Too rapid an expansion rate, so that the fluid rapidly decelerates, causes localized back-flow resulting in kinetic losses; limiting the expansion rate reduces back-flow. The phenomenon of back-flow of a compressible or incompressible fluid at the wall of a divergent circular tube was addressed by H. Blasius in "Laminare Stromung in Kanälen wechseldner Breite," *Zei tschrift f. Mathematik U. Physik*, 59, 225 (1910). Blasius found that the condition for avoiding back-flow in an expansion region is for the differential rate of increase of conduit cross-section with respect to the differential change in axial location along the fluid path to be a numerical constant divided by the fluid's Reynolds number. This condition requires that the angle at which the tube diverges be small.

Blasius's prediction was confirmed by A. H. Gibson in experiments described in "The Conversion of Kinetic to Pressure Energy in the Flow of Water Through Passages Having Divergent Boundaries," *Engineering*, vol. 93, 205 (1912). Gibson found that for a circular pipe with boundaries uniformly diverging at an angle $\theta$, the minimum loss of pressure energy occurs when $\theta$ is about $6°$. The loss is made up of two parts due, respectively, to wall friction and to shock following cross-section enlargement. As $\theta$ is reduced, the length of pipe, and therefore the friction loss, is increased; for values of $\theta$ less than $6°$, the increased friction loss more than counterbalances the reduced shock loss. As $\theta$ is increased, the loss rapidly increases, attaining a maximum in the neighborhood of $65°$. At large divergence angles, a gradual enlargement of the cross-section results in a greater pressure loss than a sudden enlargement.

OBJECTS OF THE INVENTION

In view of the limitations of the related art, it is a primary object of the present invention to provide a mass flow measuring assembly which can be incorporated into a mass flowmeter or mass flow controller, and which can perform short time constant measurements of the low mass flows and flow rates used in semiconductor fabrication processes such as ion implantation.

Another object of the invention is to provide a mass flow measuring assembly having a pressure drop sufficiently low to enable withdrawal of substantially all the adsorbed gas stored in a container in communication with a controller admitting desorbed gas into a high-vacuum chamber.

A further object of the invention is to provide a mass flow measuring assembly having a response time sufficiently short to avoid system shutdowns due to safety interrupts.

A still further object of the invention is to provide a mass flow measuring assembly that enables the cost of manufacturing a flowmeter or flow controller to be reduced by eliminating the need for separate sensor and flow splitter assemblies and housings.

Other objects of the invention will become evident when the following description is considered with the accompanying drawings.

SUMMARY OF THE INVENTION

These and other objects are met by the present invention which in one aspect provides a mass flow measuring assembly for measuring with a response time of not more than 4 seconds mass flow of a gas entering the assembly at a flow rate less than 10 sccm from a gas storage container at a pressure less than one atmosphere, and exiting into a vacuum chamber. The measuring assembly includes a capillary tube having opposed first and second ends and a central portion equidistant between the two ends. The tube has a circumferential outer surface and a cylindrical bore which determine a wall thickness. The tube second end is in fluid communication with the gas storage container. The measuring assembly further includes a diffuser section having a first aperture attached to and in fluid communication with the tube first end, and further having a conical, distally diverging passage having a small total angle, in-line with the tube bore. The passage terminates proximally in the first aperture and distally in a second aperture in fluid communication with the vacuum chamber. The passage minimizes the pressure drop of the gas exiting the second aperture. The measuring assembly further includes first and second temperature-measuring elements in thermal contact with the outer surface of the capillary tube at about the central portion, separated by a small gap.

In a first embodiment of the measuring assembly, the downstream and upstream diffuser sections each are determined circumferentially by a distally tapering outer surface. An annular compression-type seal circumscribes a portion of each surface. In a second embodiment of the measuring assembly, the downstream and upstream diffuser sections each are determined circumferentially by a cylindrical outer surface having a circumferential groove within which is disposed an O-ring.

In still another aspect the invention provides a system for controlling mass flow of a gas entering at a preselected flow rate from a gas storage container at a pressure less than one atmosphere and exiting into a vacuum chamber. The system includes a mass flow measuring assembly including a capillary tube having opposed first and second ends and a central portion equidistant between the two ends. The tube has a circumferential outer surface and a cylindrical bore determining a wall thickness. The tube second end is in fluid communication with the gas storage container. The measuring assembly further includes a first diffuser section having a first aperture attached to and in fluid communication with the tube first end, and further having a conical, distally diverging passage with a small total angle, in-line with the tube bore. The passage terminates proximally in the first aperture and distally in a second aperture in fluid communication with the vacuum chamber. The passage minimizes the pressure drop of the gas exiting the second aperture. The measuring assembly further includes a second diffuser section having a first aperture attached to and in fluid communication with the tube second end, and further having a conical, distally diverging passage with said total angle, in-line with the tube bore. The passage terminates proximally in the first aperture and distally in a second aperture in fluid communication with the gas storage container. The measuring assembly further includes first and second resistance thermometers Each thermometer is formed as a segment of an iron-nickel alloy wire. The segments are of equal length and each is wound in a tight coil around the outer surface of the tube central portion. The coils are of equal length and separated by a small gap.

The system further includes an elongated housing having an upper portion with first and second recesses, and a lower portion having a cavity within which is disposed the capillary tube. The housing further includes a circular outlet conduit, a circular section, a circular outlet aperture, a valve element, a wall with a bore into which a plug is removably inserted, and a circular inlet conduit. The outlet conduit is in fluid communication with the second aperture of the first diffuser section and in-line with the axis of the first diffuser section and the tube bore. The first diffuser section is maintained rigid by a compression-type seal or O-ring between a portion of its outer surface and the outlet conduit which is in fluid communication with the circular section which terminates in the outlet aperture. The valve element is seated within the aperture, the outlet conduit and circular section are bounded by the wall, and the inlet conduit is in fluid communication with the second aperture of the second diffuser section and in-line with the axis of the second diffuser section and the tube bore. The second diffuser section is maintained rigid by a compression-type seal or O-ring between a portion of its outer surface and the inlet conduit. The capillary tube attached to the first and second diffuser sections is thereby maintained rigid within the cavity. The system further includes a proportional solenoid having an armature acting as an actuator contiguous to the valve element, mounted within the first recess of the housing portion, and a signal conditioner having an upper portion mounted within the second recess of the housing upper portion, and a lower portion extending into the cavity and having first and second pairs of terminals in electrical contact, respectively, with the first and second resistance thermometers.

In yet another aspect the invention provides a system for measuring mass flow of a gas entering at a preselected flow rate from a gas storage container at a pressure less than one atmosphere and exiting into a vacuum chamber. The system includes a mass flow measuring assembly including a capillary tube having opposed first and second ends and a central portion equidistant between the two ends. The tube has a circumferential outer surface and a cylindrical bore determining a wall thickness. The tube second end is in fluid communication with the gas storage container. The measuring assembly further includes a first diffuser section having a first aperture attached to and in fluid communication with the tube first end, and further having a conical, distally diverging passage with a small total angle, in-line with the tube bore. The passage terminates proximally in the first aperture and distally in a second aperture in fluid communication with the vacuum chamber. The passage minimizes the pressure drop of the gas exiting the second aperture. The measuring assembly further includes a second diffuser section having a first aperture attached to and in fluid communication with the tube second end, and further having a conical, distally diverging passage with said total angle, in-line with the tube bore. The passage terminates proximally in the first aperture and distally in a second aperture in fluid communication with the gas storage container. The measuring assembly further includes first and second resistance thermometers Each thermometer is formed as a segment of an iron-nickel alloy wire. The segments are of equal length and each is wound in a tight coil around the outer surface of the tube central portion. The coils are of equal length and separated by a small gap.

The system further includes an elongated housing having an upper portion with a recess, and a lower portion having a cavity within which is disposed the capillary tube. The housing further includes a circular outlet conduit in fluid communication with the second aperture of the first diffuser section and in-line with the axis of the first diffuser section and the tube bore, and a circular inlet conduit in fluid communication with the second aperture of the second diffuser section and in-line with the axis of the second diffuser section and the tube bore. The first diffuser section is maintained rigid by a compression-type seal or O-ring between a portion of its outer surface and the outlet conduit. The second diffuser section is maintained rigid by the compression-type seal between a portion of its outer surface and the inlet conduit. The capillary tube attached to the first and second diffuser sections is thereby maintained rigid within the cavity. The system further includes a signal conditioner having an upper portion mounted within the recess of the housing upper portion, and a lower portion extending into the cavity and having having first and second pairs of terminals in electrical contact, respectively, woth the first and second resistance thermometers.

These and other features and advantages of the invention will become further apparent from the detailed description that follows, which is accompanied by drawing figures. In the figures and description, numerals indicate the various features of the invention, like numerals referring to like features throughout both the drawings and description.

BRIEF DESCRIPTION OF THE DRAWINGS

FIG. 6 is a schematic representation in cross section of a mass flowmeter incorporating the FIG. 2 measuring assembly.

DESCRIPTION OF THE PREFERRED EMBODIMENTS

I. Introduction

Figure 1:
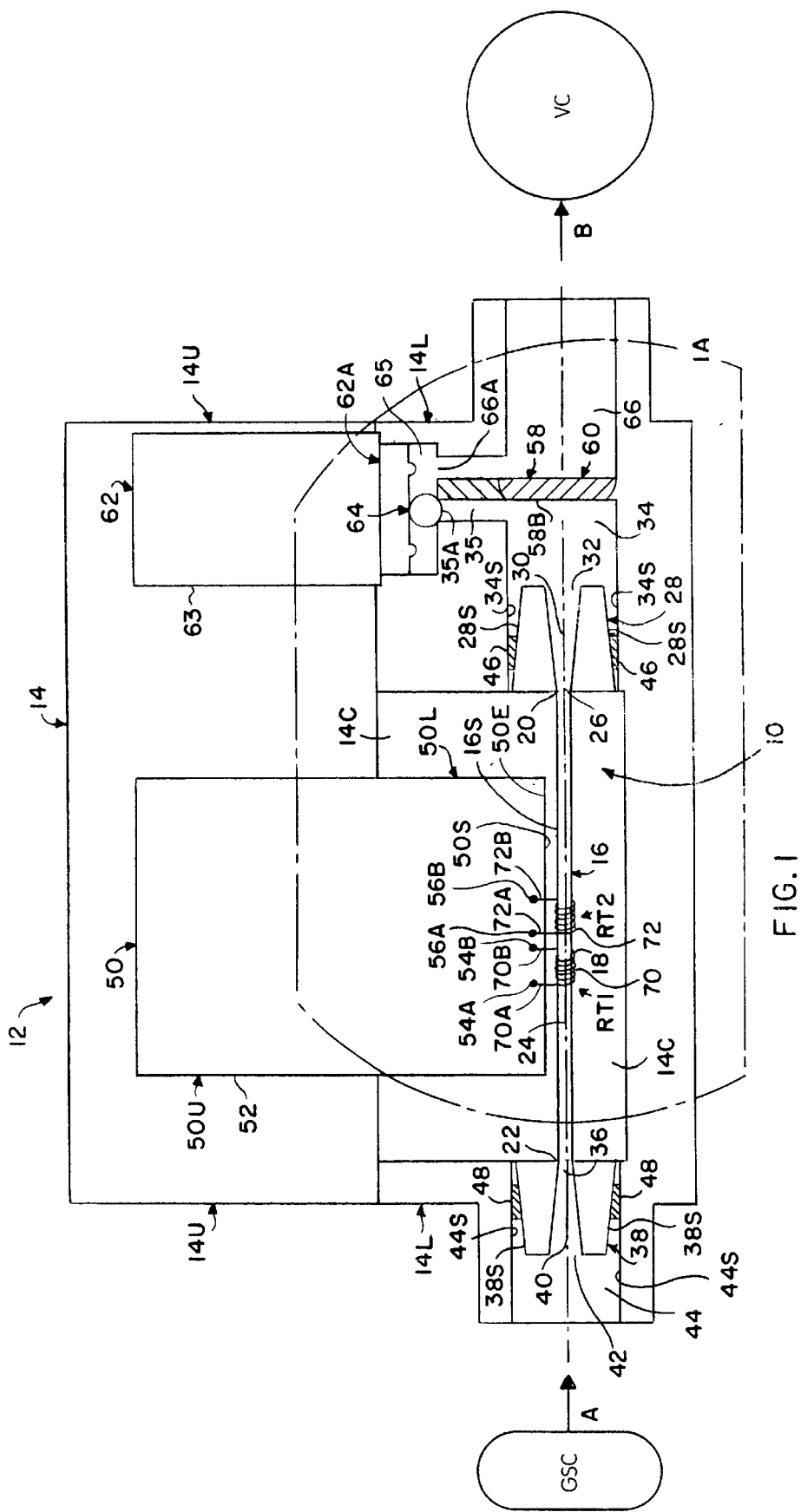
FIG. 1 is a schematic representation in cross section of a mass flow controller including a first embodiment of a mass flow measuring assembly according to the invention.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims. Structural and functional details are not necessarily to be interpreted as limiting, but as a basis for the claims. For example, while the measuring assembly of the present invention is described with regard to mass flow instrumentation, the assembly may also be incorporated into volume flow instrumentation or into any device where it is desired to take advantage of its linear flow characteristics and low pressure drop.

Where used herein, the word "attached" means that the two parts referred to (e.g., a capillary tube end and a diffuser section) are either welded or otherwise permanently joined together. Where used herein, the word "connected" means that the two parts referred to (e.g., a compression-type seal and a diffuser section) can be readily separated after being joined.

II. Measuring Assembly Incorporated Into a Mass Flow Controller

Figure 1A:
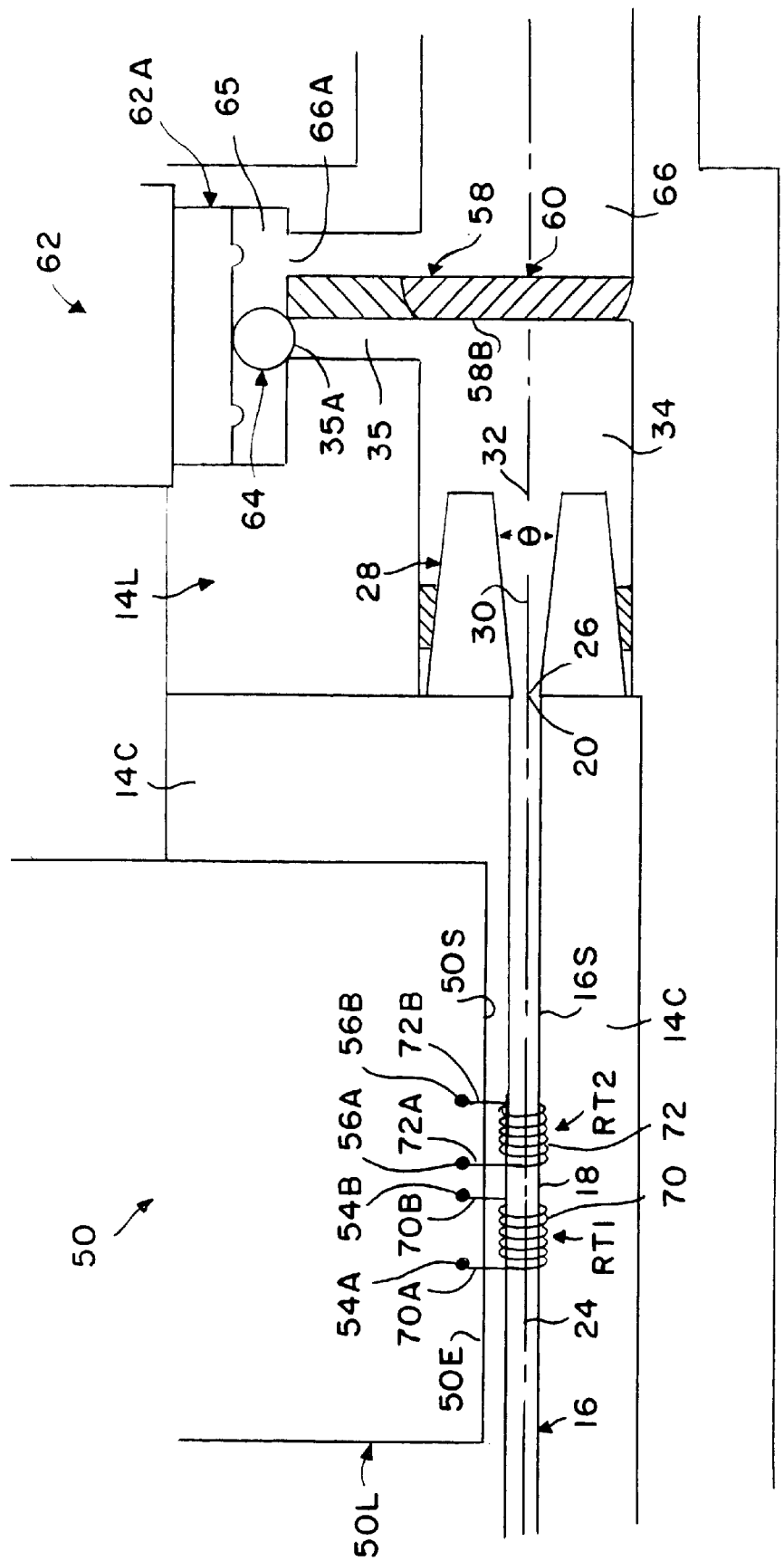
FIG. 1A is a detail view of the circled region "1A" in FIG. 1.

Referring to FIGS. 1 and 1A, a mass flow measuring assembly 10 according to a first embodiment of the invention is incorporated into a mass flow controller 12 including an elongated housing 14 with an upper portion 14U and a lower portion 14L having a cavity 14C. Measuring assembly 10 includes an axial flow passage, viz., a capillary tube 16, having a central portion 18 equidistant from a first (downstream) end 20 and a second (upstream) end 22. Tube 16 has an outer surface 16S and a circular bore 24 of a preselected diameter which determine a preselected wall thickness. It was found experimentally that when tube 16 has a bore diameter between 0.035 and 0.065 inch and a wall thickness between 0.001 and 0.003 inch, the thermal mass of the capillary tube is sufficiently small and the gas flow through the tube sufficiently large to meet the short response time (less than 4 seconds) and flow rate regime (0.25 to 10 sccm) required for compatibility with semiconductor fabrication equipment such as an ion implanter. Preferably, the bore diameter is 0.050 inch and the wall thickness is 0.002 inch. Tube end 20 is attached to a circular inlet aperture 26 of a first diffuser section 28 having a conically symmetric passage 30 therethrough terminating in a circular outlet aperture 32 in fluid communication with a circular outlet conduit 34 in lower housing portion 14L. Conduit 34 is in fluid communication with a circular section 35 terminating in a circular outlet aperture 35A. Passage 30 and conduit 34 have a common axis of symmetry which is substantially in-line with bore 24. As shown in FIG. 1A, passage 30 diverges distally at a preselected angle θ. In general accordance with the teachings of Blasius and Gibson, the angle θ is small, typically in a range from about 15° to about 23°. An angle in this range is larger than the 6° found by Gibson to minimize pressure drop; however, decreasing the angle would not appreciably decrease the kinetic losses due to expansion, but would result in an unacceptably long diffuser section. Referring again to FIG. 1, tube end 22 is attached to a circular outlet aperture 36 of a second diffuser section 38 having a conically symmetric passage 40 therethrough terminating in a circular inlet aperture 42 in fluid communication with a circular inlet conduit 44 in lower housing portion 14L into which gas enters at position A. To simplify fabrication of measuring assembly 10, the diffuser sections 28, 38 are identical. Preferably, apertures 26, 36 are welded to tube ends 20, 22, respectively. Passage 40 and conduit 44 have a common axis of symmetry which is substantially in-line with bore 24. Diffuser section 38 acts to minimize the kinetic losses due to increasing fluid velocity and reduces the pressure drop prior to diffuser section 28 further reducing and thereby minimizing the pressure drop. Measuring assembly 10 further includes an annular compression-type seal 46 compressed between conically tapering outer surface 28S of diffuser section 28 and bounding surface 34S of conduit 34. Diffuser section 28 is rigidly maintained within conduit 34 by the seal 46. Similarly, diffuser section 38 is rigidly maintained within conduit 44 by an annular compression-type seal 48 compressed between conically tapering outer surface 38S of diffuser section 38 and bounding surface 44S of conduit 44. Preferably, seals 46, 48, which serve as heat sinks for diffuser sections 28, 38 and tube 16, are fabricated from pure nickel. The conical tapering of surfaces 28S, 38S facilitates installation and removal of seals 46, 48.

Still referring to FIGS. 1 and 1A, first (upstream) and second (downstream) self-heated resistance thermometers RT1, RT2 are wound in tight coils 70, 72 around the portion of outer surface 16S at tube central portion 18. Coils 70, 72 terminate, respectively, in electrical leads 70A, 70B and 72A, 72B connected, respectively, to terminals 54A, 54B and 56A, 56B. Signal conditioner 50 interprets the difference in temperature between thermometers RT1, RT2 as a measure of the mass flow. Alternatively, when the thermometers are maintained at the same temperature, the signal conditioner can be configured to interpret the difference in wattage necessary to maintain equal temperatures as being a measure of flow mass. It was found experimentally that sensor response times less than four seconds are achieved when: coils 70, 72 are segments of equal length of an iron-nickel alloy wire having a diameter between 0,0003 and 0.0006 inch; each coil occupies a winding length between 0.015 and 0.030 inch; the coils are separated by a gap between 0.010 to 0.040 inch; and the gap is at the center of central portion 18 so that the coils are symmetrically disposed midway between tube ends 22 and 20. Preferably, the wire diameter is 0.0004 inch, the winding length of each coil is about 0.020 inch, and the gap is about 0.020 inch. Suitable iron-nickel wire is available under the trade name BALCO™ from Amax Specialty Metals Corporation of Parsippany, N.J. To get accurate temperature differential measurements between thermometers RT1 and RT2, it is essential that the thermometers be thermally isolated from housing 14. A spacing within cavity 14C of about 10 to 20 capillary tube diameters (i.e., 0.54 to 1.0 inches) between the coils and the nearest heat sink was found to provide thermal isolation.

Gas exiting tube end 20 into diffuser section 28 undergoes expansion converting "velocity head" (i.e., kinetic energy per unit mass) into "pressure head" (i.e., pressure energy per unit mass). Gas exiting aperture 32 has a low pressure drop because the gas has expanded at a low, controlled rate, and because the tube 16 and diffuser section passage 30 are in-line, eliminating right-angle turns. Gas entering tube end 22 from diffuser section 38 undergoes compression converting pressure head into velocity head. Unlike the expansion, this compression is an efficient process involving a small loss of head and is marginally significant in the present invention.

It will be appreciated by those skilled in mass flow sensor design that thermocouples, thermistors or other temperature measuring elements may be substituted for the iron-nickel alloy wire coils used for thermometers RT1, RT2, provided that the two elements be brought into excellent thermal contact with surface 16S, are sufficiently small in length, are sufficiently closely matched in temperature response characteristics, and have a sufficiently small mass. It will be further appreciated that rather than using self-heated elements, a heating element may be interposed between the two temperature elements.

Figure 2:
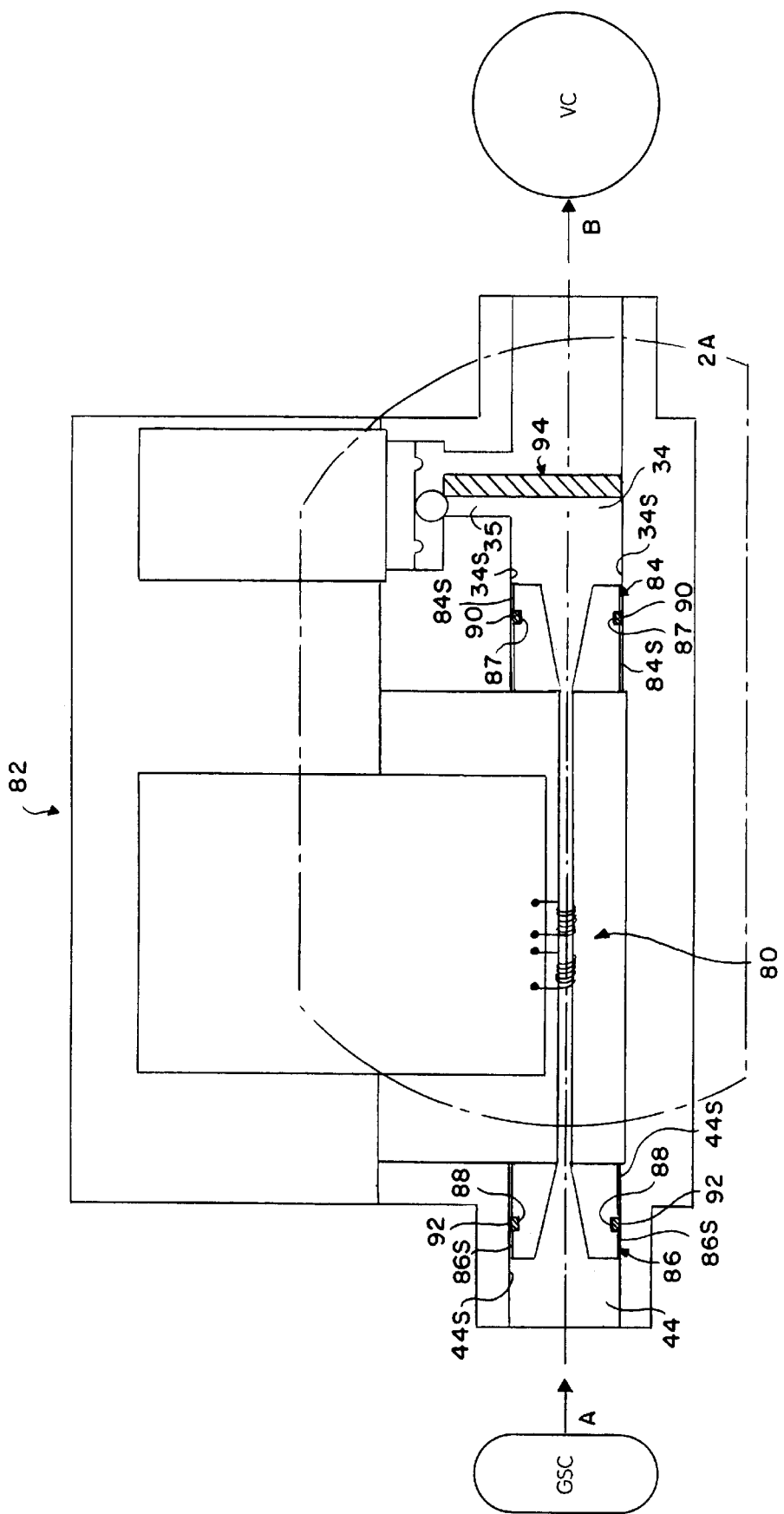
FIG. 2 is a schematic representation in cross section of a mass flow controller including a second embodiment of a mass flow measuring assembly.
Figure 2A:
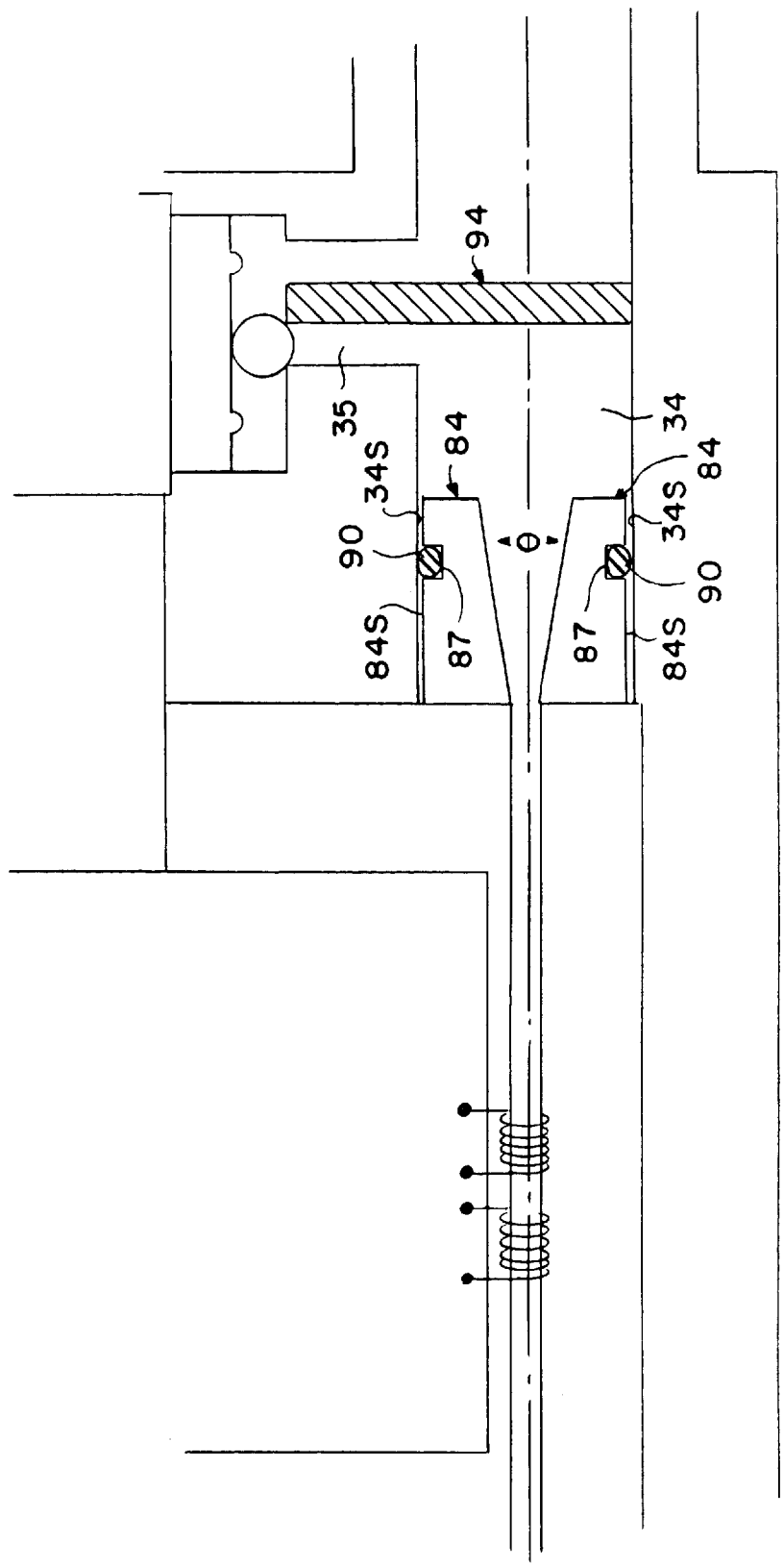
FIG. 2A is a detail view of the circled region "2A" in FIG. 2.

Referring to FIGS. 2 and 2A, a mass flow measuring assembly 80 according to a second embodiment of the invention is incorporated into a mass flow controller 82. Measuring assembly 80 and controller 82 are identical in configuration, respectively, to measuring assembly 10 and controller 12, with the following exceptions. First and second diffuser sections 84, 86 have the same internal configuration as diffuser sections 28, 38 but have a cylindrical outer surface 84S, 86S, respectively, with a circumscribing groove 87, 88, respectively, adapted to receive an O-ring, rather than a conically tapering surface. Diffuser sections 84, 86 are rigidly maintained within conduits 34, 44, respectively, by O-rings 90, 92 disposed, respectively, in grooves 87, 88 and compressed against bounding surfaces 34S, 44S, respectively. Outlet conduit 34 and circular section 35 are bounded by a solid wall 94 rather than by a wall with a removable plug.

Figure 3:
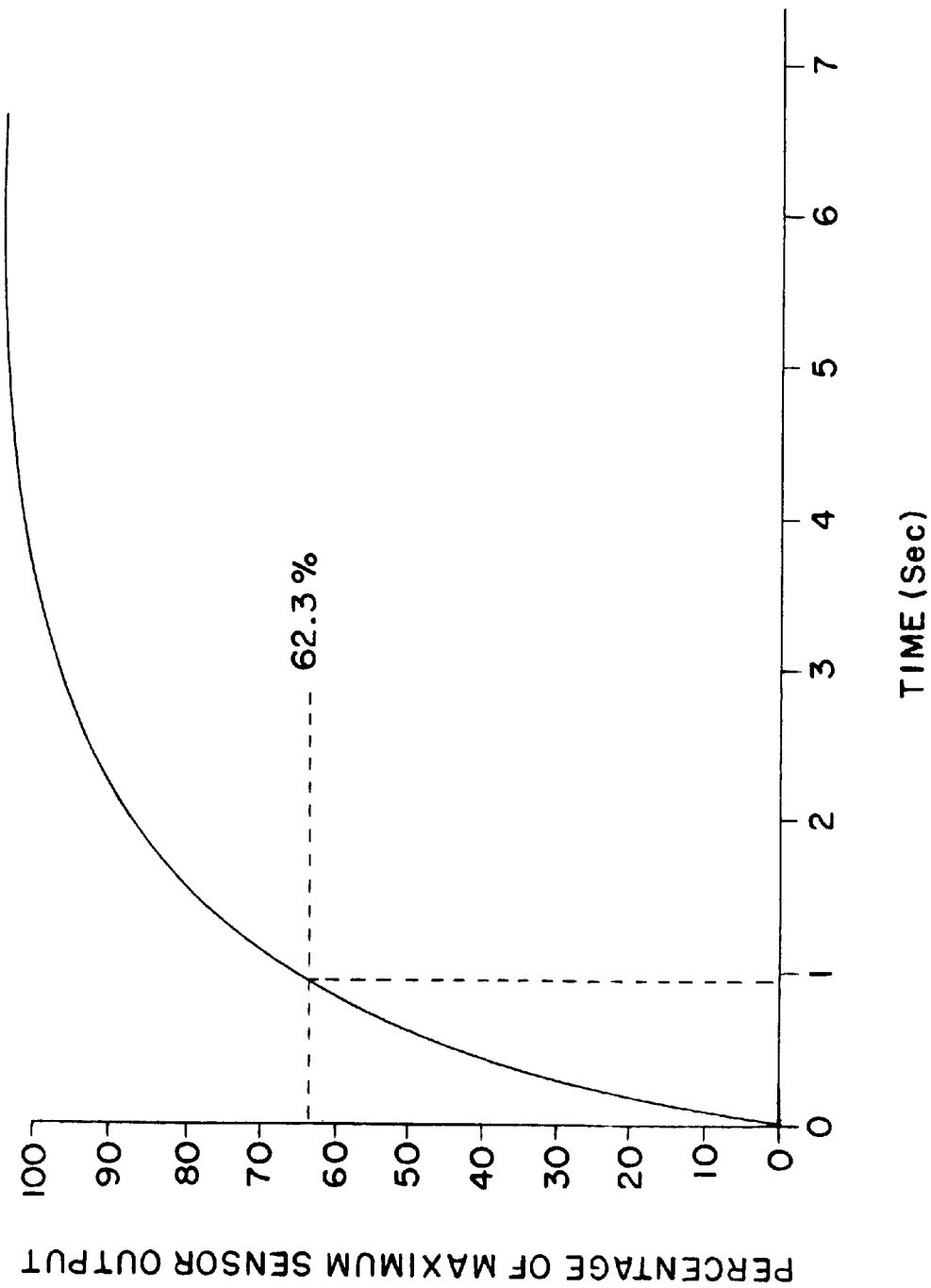
FIG. 3 shows the experimentally determined response time of the FIG. 1 or FIG. 2 measuring assembly when arsine gas is flowing through the controller at a rate of 5 sccm.

FIG. 3 shows the experimentally determined response time of measuring assembly 10 or measuring assembly 80 when arsine gas flows through controller 12 or controller 82 at a rate of 5 sccm. The curve shows the percentage of maximum sensor output as a function of time. The response time, defined as the time needed for the sensor output to reach 62.3% of its maximum, is about 1.0 second.

Figure 4:
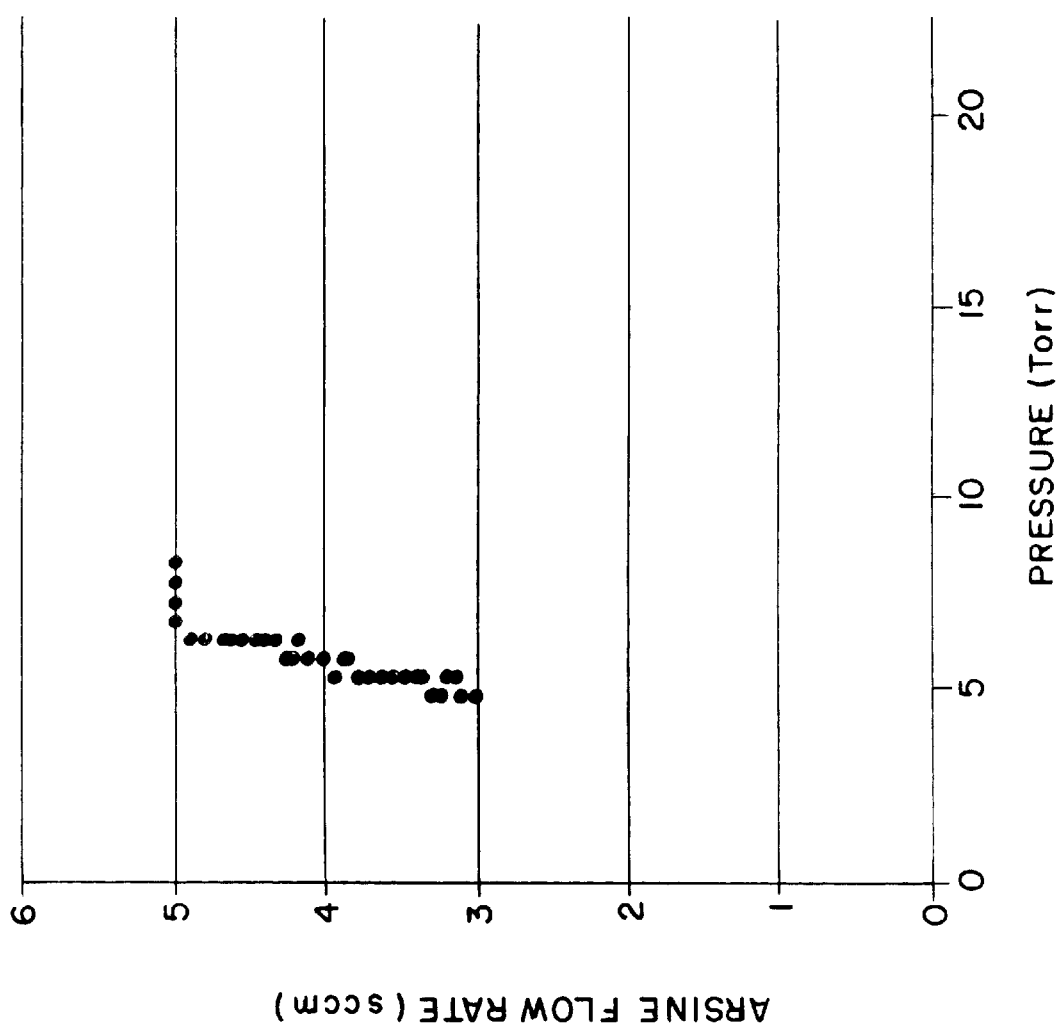
FIG. 4 shows the experimentally determined flow rate of arsine gas through the FIG. 1 or FIG. 2 mass flow controller as a function of the residual pressure within an ATMI adsorption container connected to the controller.

FIG. 4 shows the experimentally determined flow rate of arsine gas through controller 12 or controller 82 as a function of the residual pressure within an ATMI adsorption container connected to the controller. Each data point represents a measured flow rate at a given pressure. The data show that flow rates less than 5 sccm are achieved at a residual pressure of about 5 Torr.

III. Measuring Assembly Incorporated Into a Flowmeter

Figure 5:
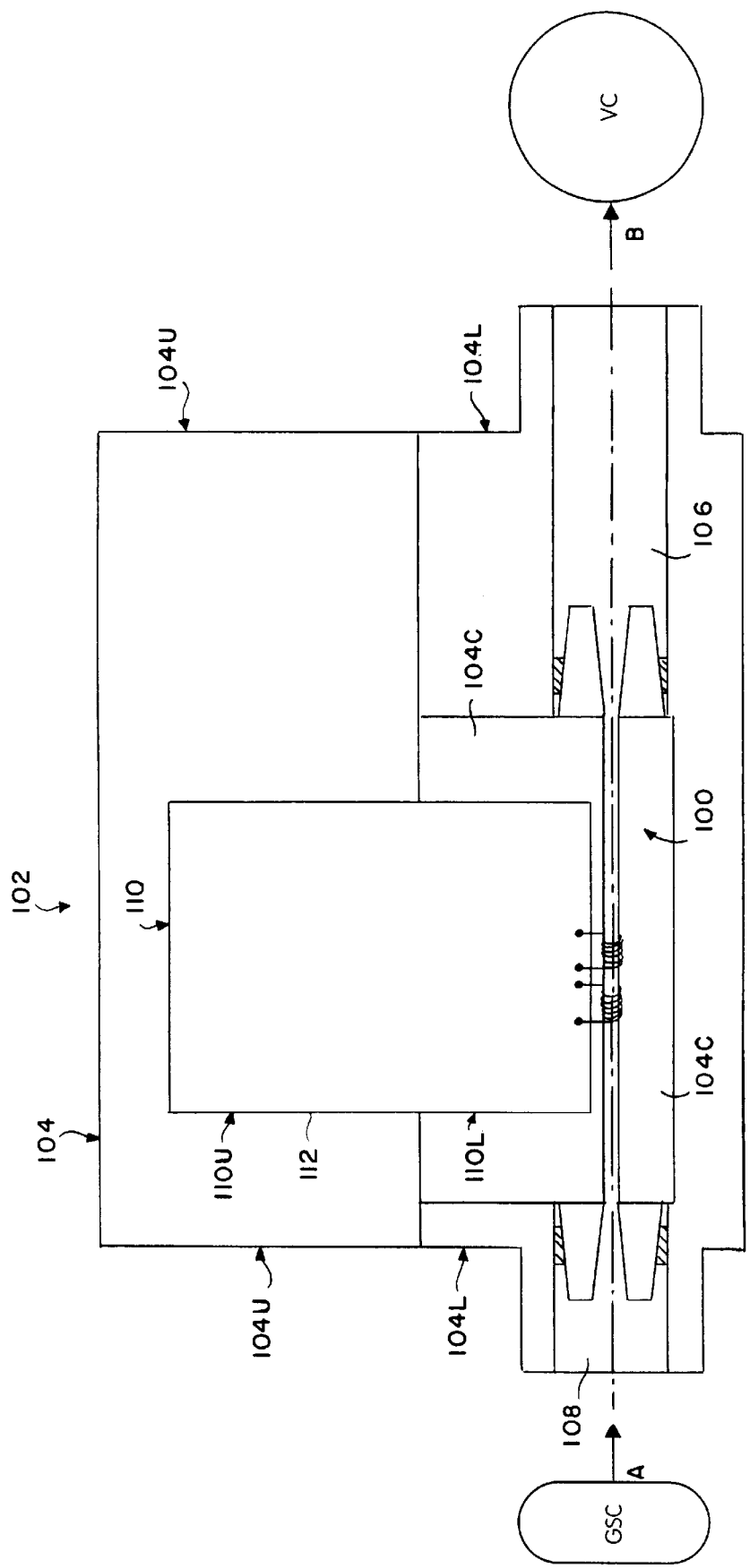
FIG. 5 is a schematic representation in cross section of a mass flowmeter incorporating the FIG. 1 measuring assembly.

Referring to FIG. 5, a mass flow measuring assembly 100 identical in configuration to assembly 10 is incorporated into a mass flowmeter 102. The flowmeter includes an elongated housing 104 with an upper portion 104U and a lower portion 104L having a cavity 104C. Flowmeter 102 further includes a circular outlet conduit 106 in lower housing portion 104L. Unlike conduit 34, conduit 106 is not in fluid communication with a valve element. Rather, gas entering at A flows through a circular inlet conduit 108 in lower housing portion 104L, traverses the measuring assembly 100, and exits at B through conduit 106. Flowmeter 102 further includes a signal conditioner 110 having an upper portion 110U rigidly mounted with a recess 112 in upper housing portion 104U, and a lower portion 110L extending into the cavity 104C. The signal conditioner is disposed with respect to measuring assembly 100 in the same configuration as is signal conditioner 50 with respect to measuring assembly 10. Unlike the mass flow controller 12, the mass flowmeter 102 does not include a proportional solenoid, a valve element, and a plug.

Referring to FIG. 6, a mass flow measuring assembly 120 identical in configuration to assembly 80 is incorporated into a mass flowmeter 122 otherwise identical in configuration to flowmeter 102.

What is claimed is:

1. A mass flow measuring assembly for performing a multiplicity of measurements of mass flow of a gas entering the assembly at a flow rate less than a predetermined maximum flow rate from a gas storage container at a pressure less than one atmosphere and exiting the assembly into a vacuum chamber, each measurement performed within not more than a predetermined maximum response time, the assembly comprising:

a capillary tube having opposed first and second ends and a central portion equidistant between said first and second ends, the tube having a circumferential outer surface and a generally cylindrical bore of a preselected diameter determining a preselected wall thickness, the tube second end in fluid communication with the gas storage container;

a diffuser section having first and second apertures, the first aperture attached to and in fluid communication with the tube first end, and further having a conical, distally diverging passage therethrough symmetric about an axis of symmetry substantially in-line with the tube bore, said passage terminating proximally in said first aperture and distally in said second aperture, said second aperture in fluid communication with the vacuum chamber, said passage minimizing pressure drop of the gas exiting said second aperture; and first and second temperature-measuring elements, said elements in thermal contact with the outer surface of the capillary tube at about the central portion, said elements separated by a gap of a preselected width, said maximum flow rate being 10 sccm and said maximum response time being 4 seconds.

2. The measuring assembly of claim 1, wherein the temperature-measuring elements are selected from the group consisting of resistance thermometers, thermocouples, and thermistors.

3. The measuring assembly of claim 2, wherein the resistance thermometers are self-heated.

4. The measuring assembly of claim 2, wherein:
the bore diameter is in a range from 0.035 to 0.065 inch;
the wall thickness is in a range from 0.001 to 0.003 inch; and
the conical passage of the diffuser section diverges distally at a small total angle.

5. The measuring assembly of claim 4, wherein the total angle is in a range from about 15° to about 23°.

6. A mass flow measuring assembly for performing a multiplicity of measurements of mass flow of a gas entering the assembly at a preselected flow rate in a range from 0.25 to 10 sccm from a gas storage container at a pressure less than 10 Torr and exiting the assembly into a vacuum chamber, each measurement performed within not more than 4 seconds, the assembly comprising:

a capillary tube having opposed first and second ends and a central portion equidistant between said first and second ends, the tube having a circumferential outer surface and a generally cylindrical bore of a preselected diameter, said outer surface and bore determining a preselected wall thickness, the tube second end in fluid communication with the gas storage container;

a first diffuser section having first and second apertures, said first aperture attached to and in fluid communication with the tube first end, and further having a conical, distally diverging passage therethrough symmetric about an axis of symmetry substantially in line with the tube bore, said passage diverging distally at a preselected small total angle and terminating proximally in said first aperture and distally in said second aperture, said second aperture in fluid communication with the vacuum chamber, said passage minimizing pressure drop of the gas exiting said second aperture;

a second diffuser section having first and second apertures, said first aperture attached to and in fluid communication with the tube second end, and further having a conical, distally diverging passage therethrough symmetric about an axis of symmetry substantially in-line with the tube bore, said passage diverging distally at said preselected total angle and terminating proximally in said first aperture and distally in said second aperture, said passage reducing pressure drop of the gas exiting said first aperture and entering said tube second end, said second aperture in fluid communication with the gas storage container; and first and second resistance thermometers, each thermometer being formed as a segment of an iron-nickel alloy wire of a predetermined diameter, the segments of equal length, each segment wound in a tight coil around the outer surface of the tube central portion, the coils of equal length and separated by a predetermined gap.

7. The measuring assembly of claim 6, wherein:
the tube bore diameter is in a range from 0.035 to 0.065 inch;
the tube wall thickness is in a range from 0.001 to 0.003 inch;
the wire diameter is in a range from 0.0003 to 0.0006 inch;
the gap separating the coils is in a range from 0.015 to 0.025 inch;
the length of each wound coil is in a range from 0.015 to 0.030 inch; and
the total angle of divergence of each said conical, distally diverging passage is in a range from about 15° to about 23°.

8. The measuring assembly of claim 7, wherein the first and second diffuser sections each are determined circumferentially by a distally tapering outer surface, and a portion of each outer surface is circumscribed by a generally annular compression-type seal.

9. The measuring assembly of claim 7, wherein the first and second diffuser sections each are determined circumferentially by a generally cylindrical outer surface having a circumferential groove within which is disposed an O-ring.

10. A system for controlling mass flow of a gas entering in at a preselected flow rate from a gas storage container at a pressure less than one atmosphere and exiting into a vacuum chamber, the system comprising:

a mass flow measuring assembly comprising a capillary tube having opposed first and second ends and a central portion equidistant between said first and second ends, the tube having a circumferential outer surface and a generally cylindrical bore of a preselected diameter, said outer surface and bore determining a preselected wall thickness, the tube second end in fluid communication with the gas storage container; said measuring assembly further comprising a first diffuser section having first and second apertures, said first aperture attached to and in fluid communication with the tube first end, and further having a conical, distally diverging passage therethrough symmetric about an axis of symmetry substantially in-line with the tube bore, said passage diverging distally at a preselected small total angle and terminating proximally in said first aperture and distally in said second aperture, said second aperture in fluid communication with the vacuum chamber, said passage minimizing pressure drop of the gas exiling said second aperture; said measuring assembly further comprising a second diffuser section having first and second apertures, said first aperture attached to and in fluid communication with the tube second end, and further having a conical, distally diverging passage therethrough symmetric about an axis of symmetry substantially in-line with the tube bore, said passage diverging distally at said preselected total angle and terminating proximally in said first aperture and distally in said second aperture, said passage reducing pressure drop of the gas exiting said first aperture and entering said tube second end, said second aperture in fluid communication with the gas storage container; and said measuring assembly further comprising first and second resistance thermometers, each thermometer being formed as a segment of an iron-nickel alloy wire of a predetermined diameter, the segments of equal length, each segment wound in a tight coil around the outer surface of the tube central portion, the coils of equal length and separated by a predetermined gap.

11. The system of claim 10, wherein said first and second diffuser sections each are determined circumferentially by a distally tapering outer surface, and a portion of each outer surface is circumscribed by a generally annular compression-type seal.

12. The system of claim 11, further comprising:

an elongated housing comprising an upper portion and a lower portion, the upper portion having first and second recesses, the lower portion having a cavity within which is disposed the capillary tube, and further having a generally circular outlet conduit, a generally circular section, a generally circular outlet aperture, a valve element, a wall having a bore, a plug removably inserted into the bore, and a generally circular inlet conduit, the outlet conduit in fluid communication with said second aperture of the first diffuser section and substantially in-line with the axis of the first diffuser section and the tube bore, the first diffuser section maintained rigid by the compression-type seal between said tapering outer surface and the outlet conduit, the outlet conduit in fluid communication with the circular section, the circular section terminating in the outlet aperture, the valve element seated within the aperture, the outlet conduit and circular section bounded by the wall, the inlet conduit in fluid communication with said second aperture of the second diffuser section and substantially in-line with the axis of the second diffuser section and the tube bore, the second diffuser section maintained rigid by the compression-type seal between said tapering outer surface and the inlet conduit, the capillary tube attached to the first and second diffuser sections maintained rigid within said cavity; and a proportional solenoid having an armature, and a signal conditioner having an upper portion and a lower portion, the lower portion having first and second pairs of electrical terminals, the solenoid mounted within the first recess of the housing upper portion, the valve element contiguous to the armature, the signal conditioner upper portion mounted within the second recess of the housing upper portion, the signal conditioner lower portion extending into said cavity, the first and second resistance thermometers in electrical contact, respectively, with the first and second pairs of terminals.

13. The system of claim 10, wherein said first and second diffuser sections each are determined circumferentially by a generally cylindrical outer surface having a circumferential groove within which is disposed an O-ring.

14. The system or claim 13, further comprising:

an elongated housing comprising an upper portion and a lower portion, the upper portion having first and second recesses, the lower portion having a cavity within which is disposed the capillary tube, and further having a generally circular outlet conduit, a generally circular section, a generally circular outlet aperture, a valve element, a wall having a bore, a plug removably inserted into the bore, and a generally circular inlet conduit, the outlet conduit in fluid communication with said second aperture of the first diffuser section and substantially in-line with the axis of the first diffuser section and the tube bore, the first diffuser section maintained rigid by the compressed O-ring between said cylindrical outer surface and the outlet conduit, the outlet conduit in fluid communication with the circular section, the circular section terminating in the outlet aperture, the valve element seated within the aperture, the outlet conduit and circular section bounded by the wall, the inlet conduit in fluid communication with said second aperture of the second diffuser section and substantially in-line with the axis of the second diffuser section and the tube bore, the second diffuser section maintained rigid by the compressed O-ring between said cylindrical outer surface and the inlet conduit, the capillary tube attached to the first and second diffuser sections maintained rigid within said cavity; and a proportional solenoid having an armature acting as an actuator, and a signal conditioner having an upper portion and a lower portion, the lower portion having first and second pairs of electrical terminals, the solenoid mounted within the first recess of the housing upper portion, the valve element contiguous to the armature, the signal conditioner upper portion mounted within the second recess of the housing upper portion, the signal conditioner lower portion extending into said cavity, the first and second resistance thermometers in electrical contact, respectively, with the first and second pairs of terminals.

15. A system for measuring mass flow of a gas entering in at a preselected flow rate from a gas storage container at a pressure less than one atmosphere and exiting into a vacuum chamber, the system comprising:

a mass flow measuring assembly comprising a capillary tube having opposed first and second ends and a central portion equidistant between said first and second ends, the tube having a circumferential outer surface and a generally cylindrical bore of a preselected diameter, said outer surface and bore determining a preselected wall thickness, the tube second end in fluid communication with the gas storage container; said measuring assembly further comprising a first diffuser section having first and second apertures, said first aperture attached to and in fluid communication with the tube first end, and further having a conical, distally diverging passage therethrough symmetric about an axis of symmetry substantially in-line with the tube bore, said passage diverging distally at a preselected small total angle and terminating proximally in said first aperture and distally in said second aperture, said second aperture in fluid communication with the vacuum chamber, said passage minimizing pressure drop of the gas exiting said second aperture; said measuring assembly further comprising a second diffuser section having first and second apertures, said first aperture attached to and in fluid communication with the tube second end, and further having a conical, distally diverging passage therethrough symmetric about an axis of symmetry substantially in-line with the tube bore, said passage diverging distally at said preselected total angle and terminating proximally in said first aperture and distally in said second aperture, said passage reducing pressure drop of the gas exiting said first aperture and entering said tube end, said second aperture in fluid communication with the gas storage container; and said measuring assembly further comprising first and second resistance thermometers, each thermometer being formed as a segment of an iron-nickel alloy wire of a predetermined diameter, the segments of equal length, each segment wound in a tight coil around the outer surface of the tube central portion, the coils of equal length and separated by a predetermined gap.

16. The system of claim 15, wherein said first and second diffuser sections each are determined circumferentially by a distally tapering outer surface, and a portion of each outer surface is circumscribed by a generally annular compression-type seal.

17. The system of claim 16, further comprising:
an elongated housing comprising an upper portion and a lower portion, the upper portion having a recess, the lower portion leaving a cavity within which is disposed the capillary tube, and further having a generally circular outlet conduit and a generally circular inlet conduit, the outlet conduit in fluid communication with said second aperture of the first diffuser section and substantially in-line with the axis of the first diffuser section and the tube bore, the first diffuser section maintained rigid by the compression-type seal between said tapering outer surface and the outlet conduit, the inlet conduit in fluid communication with said second aperture of the second diffuser section and substantially in-line with the axis of the second diffuser section and the tube bore, the second diffuser section maintained rigid by the compression-type seal between said tapering outer surface and the inlet conduit, the capillary tube attached to the first and second diffuser sections maintained rigid within said cavity; and
a signal conditioner having an upper portion and a lower portion, the lower portion having first and second pairs of electrical terminals, the upper portion mounted within the recess of the housing upper portion, the signal conditioner lower portion extending into said cavity, the first and second resistance thermometers in electrical contact, respectively, with the first and second pairs of terminals.

18. The system of claim 15, wherein said first and second diffuser sections each are determined circumferentially by a generally cylindrical outer surface having a circumferential groove within which is disposed an O-ring.

19. The system of claim 18, further comprising:
an elongated housing comprising an upper portion and a lower portion, the upper portion having a recess, the lower portion having a cavity within which is disposed the capillary tube, and further having a generally circular outlet conduit and a generally circular inlet conduit, the outlet conduit in fluid communication with said second aperture of the first diffuser section and substantially in-line with the axis of the first diffuser section and the tube bore, the first diffuser section maintained rigid by the compressed O-ring between said cylindrical outer surface and the outlet conduit, the inlet conduit in fluid communication with said second aperture of the second diffuser section and substantially in-line with the axis of the second diffuser section and the tube bore, the second diffuser section maintained rigid by the compressed O-ring between said cylindrical outer surface and the inlet conduit, the capillary tube attached to the first and second diffuser sections maintained rigid within said cavity; and
a signal conditioner having an upper portion and a lower portion, the lower portion having first and second pairs of electrical terminals, the upper portion mounted within the recess of the housing upper portion, the signal conditioner lower portion extending into said cavity, the first and second resistance thermometer in electrical contact, respectively, with the first and second pairs of terminals.

\* \* \* \* \*